United States Patent
Redfern et al.

[19]

[11] Patent Number: 5,999,090
[45] Date of Patent: Dec. 7, 1999

[54] ALARM SENSOR AND ANTENNA ARRANGEMENT

[75] Inventors: Stephen W Redfern, Eagle; Paul A Tyson, Doddington Park; Peter P Blunden, Reepham, all of United Kingdom

[73] Assignee: Mitel Semiconductor Limited, United Kingdom

[21] Appl. No.: 09/006,520

[22] Filed: Jan. 13, 1998

[30] Foreign Application Priority Data

Feb. 4, 1997 [GB] United Kingdom .................... 9702242

[51] Int. Cl.$^6$ ................................ B60R 25/10
[52] U.S. Cl. ............... 340/426; 340/425.5; 340/541; 340/552; 307/10.2
[58] Field of Search ................... 340/426, 430, 340/554, 425.5, 565, 561, 552, 541, 545.3; 307/10.2, 10.1

[56] References Cited

U.S. PATENT DOCUMENTS

| | | | |
|---|---|---|---|
| 3,665,443 | 5/1972 | Galvin ..................... | 340/426 |
| 3,728,721 | 4/1973 | Lee et al. . | |
| 3,922,660 | 11/1975 | Galvin ..................... | 340/426 |
| 4,117,466 | 9/1978 | Lichtblau . | |
| 4,173,019 | 10/1979 | Williams . | |
| 4,225,858 | 9/1980 | Cole et al. ............... | 340/554 |
| 4,275,390 | 6/1981 | Heywang et al. ........ | 340/554 |
| 4,306,228 | 12/1981 | Meyer ..................... | 340/565 |
| 4,458,240 | 7/1984 | Rittenbach et al. ...... | 340/554 |
| 4,529,972 | 7/1985 | Paterson et al. . | |
| 4,729,120 | 3/1988 | Steiner et al. ............ | 340/554 |
| 4,841,163 | 6/1989 | Mueller ................... | 340/565 |
| 5,289,159 | 2/1994 | Iwata ....................... | 340/426 |
| 5,396,217 | 3/1995 | Proefke et al. ........... | 340/554 |
| 5,400,039 | 3/1995 | Araki et al. . | |
| 5,581,237 | 12/1996 | DiPoala ................... | 340/554 |

FOREIGN PATENT DOCUMENTS

| | | |
|---|---|---|
| 0 088 948 A1 | 9/1983 | European Pat. Off. . |
| 0 535 780 A1 | 4/1993 | European Pat. Off. . |
| 1 336 255 | 11/1973 | United Kingdom . |
| 1 389 397 | 4/1975 | United Kingdom . |
| 1 470 884 | 4/1977 | United Kingdom . |
| 2 108 301 | 5/1983 | United Kingdom . |
| 2 230 776 | 10/1990 | United Kingdom . |
| 2 236 926 | 4/1991 | United Kingdom . |
| 2 244 381 | 11/1991 | United Kingdom . |
| 2 253 108 | 8/1992 | United Kingdom . |
| 2 300 776 | 11/1996 | United Kingdom . |
| 2 302 773 | 1/1997 | United Kingdom . |

*Primary Examiner*—Jeffery A. Hofsass
*Assistant Examiner*—Anh La
*Attorney, Agent, or Firm*—Kirschstein, et al.

[57] ABSTRACT

A microwave frequency Doppler vehicle intruder alarm comprises an oscillator 3, a mixer 2 and an amplification stage 4, 5 having its output applied to a low-pass filter 7, whose output is split into two branches. A first branch, comprising a rectifier diode and a comparator, provides a signal on its output when a significant level of non-carrier microwave signals is received. This branch is sensitive to signals having Doppler frequencies of 0–200 Hz, which includes the intruder indicative frequencies. A second branch, comprising an amplifier 8, a high pass filter 9, and a comparator 10, provides an output signal on the detection of a significant level of signals in the 40–200 Hz band, which frequencies are indicative of externally generated interference. A logic element 15 mutes the output of the alarm when the second branch indicates the presence of externally generated interference. An antenna arrangement (FIG. 3, not shown) generates a rectangular radiation field which provides optimum coverage of the interior of a vehicle by being mounted in the roof thereof. Steering of the radiation field to provide optimum illumination when the arrangement is mounted off-center on the roof is achieved by the use of a shunt capacitor to effect a phase difference in signals applied to respective ones of first and second antennae.

6 Claims, 4 Drawing Sheets

ALARM SENSOR AND ANTENNA ARRANGEMENT

BACKGROUND OF THE INVENTION

The present invention relates to an alarm sensor and more particularly, although not exclusively, to an alarm sensor suitable for use in a microwave frequency vehicle intruder alarm.

Another aspect of the present invention relates to an antenna arrangement for use in a vehicle intruder alarm.

Vehicle intruder alarms which rely on detection of the Doppler shift of a reflected microwave signal to indicate movement within a space have been available for several years. One such alarm is described in United Kingdom Patent Application No. GB-A-2280558, the contents of which are incorporated herein by reference.

A problem has been identified with such alarms in that microwave energy leaked from microwave ovens can cause them to be falsely triggered.

Microwave ovens typically employ a cavity magnetron source, the frequency of which will vary as the load Voltage standing wave ratio or VSWR within the oven changes due to rotation of the turntable or mode-stirrer paddle. As microwave ovens typically operate at 2.5 GHz, microwave alarm sensors operating in the 2.45 GHz ISM band can often be subjected to strong interference, traversing their operating frequency.

Microwave ovens also tend to have poorly filtered and regulated power supplies. This typically results in wideband am and fm signals extending several hundred MHZ either side of the centre frequency. These sidebands contain the fundamental mains frequency and many higher order harmonic frequencies.

These modulation phenomena can cause false triggering of low power microwave alarm sensors in two ways. Firstly, the sensor can mistake rectified am sidebands as a Doppler shifted reflection, i.e. as a moving target. Secondly, especially in single antenna systems such as that described in United Kingdom Patent Application No. GB-A-2280558, an oscillator of the sensor can injection lock to the frequency of the powerful interfering signal. In this instance, the sensor will be triggered as the oscillator becomes locked or as it unlocks itself.

SUMMARY OF THE INVENTION

In accordance with the present invention, there is provided an alarm sensor in which a microwave frequency signal is transmitted to illuminate a volume, reflected by surfaces within that volume and received by an antenna, comprising means to detect signals within a first frequency band, means to determine whether said detected signals are indicative of the presence of a source of interference, and means, responsive to said determining means, to control an output of the alarm sensor.

In accordance with another aspect of the present invention, there is provided an antenna for use in a vehicle intruder alarm comprising a power divider arranged to provide at least two patch antennae with a common signal, the antennae being arranged to radiate a field having a section which is predetermined in shape by the interaction of said patch antennae.

Preferably said shape is substantially rectangular.

BRIEF DESCRIPTION OF THE DRAWINGS

An embodiment will now be described, by way of example only, with reference to the accompanying drawings of which.

DETAILED DESCRIPTION OF THE PREFERRED EMBODIMENTS

Figure 1:
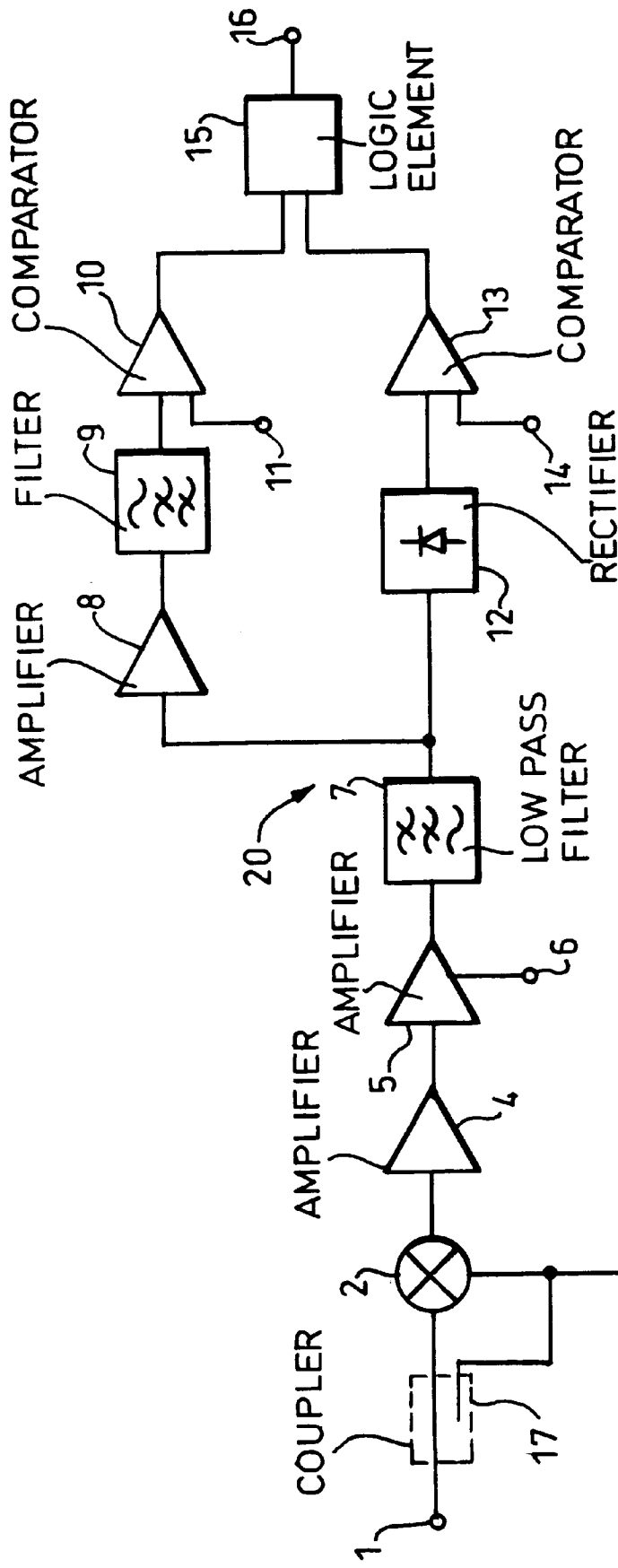
FIG. 1 shows an alarm sensor in accordance with a first aspect of the present invention.

Referring to FIG. 1, an alarm sensor 20A is shown which operates to mute its output in the presence of microwave oven generated interference.

An oscillator 3 generates a RF signal which is fed to both of an antenna (not shown) connected to an antenna terminal 1 through a coupler 17, and a mixer 2. Mixer 2 therefore mixes the signal from the oscillator 3 with a reflected signal received by the antenna (not shown). Such an arrangement using a single antenna is described in United Kingdom Patent Application No. GB-A-2280558. An amplifier 4 amplifies the output signal of the mixer 2. A variable gain amplifier 5 further amplifies the signal, under control of a signal on a terminal 6, which is then filtered by a low pass filter 7.

At this stage, the signal is split into two branches. The first branch is made up of a rectifier 12 and a comparator 13. The rectifier 12 is preferably an active precision rectifier which is able to accommodate low-level signals at its input. The output of the rectifier 12 is compared with a reference potential, applied to a terminal 14, by the comparator 13. This first branch operates to detect when the output of the filter 7 shows there to be an amount of non-carrier microwave signals above a predetermined amplitude threshold. This first branch is much the same as that described in United Kingdom Patent Application No. GB-A-2280558.

The second branch is made up of an amplifier 8, a high pass filter 9 and a comparator 10. The signal from filter 7 is amplified by amplifier 8, and then filtered by the filter 9, to remove the low frequency signals. The resultant signal is then compared with a reference voltage, applied to a terminal 11, by a comparator 10.

In one implementation, the filter 7 has a cut-off frequency of about 200 Hz and the filter 9 has a cut-off frequency of 40 Hz. In this way, the bandwidth of sensor 20A is very limited, relative to the high RF frequencies involved, but is still much higher than the bandwidth needed for moving target detection. The second branch is able to detect the level of the signal which is characteristic of the am sidebands of microwave ovens. This is used as a measurement of oven interference, which is compared to a predetermined threshold by the comparator 10.

When the comparator 10 determines that there is a sufficiently high signal level in the 40–200 Hz band, it sends its output high, indicating the presence of the characteristics of microwave oven generated interference.

The output signals of comparators 10 and 13 are applied to a logic element 15. The logic element 15 generates an output pulse only when the comparator 13 has a high output and the comparator 10 has a low output. In this way, the sensor output is muted in the presence of the characteristic modulation signature of a microwave oven.

In order to prevent false alarms where the comparator 13 sends its output high before the comparator 10, in the presence of microwave oven generated interference, the rectifier 12 preferably includes a charge pump. This charge pump will cause a time delay of approximately 100 ms in the first branch, thereby allowing the second branch some time to react to oven generated interference.

The rectifier 12 and the comparator 13 could be replaced by a window comparator (not shown), this achieving the same effect but at a lower cost.

Figure 2:
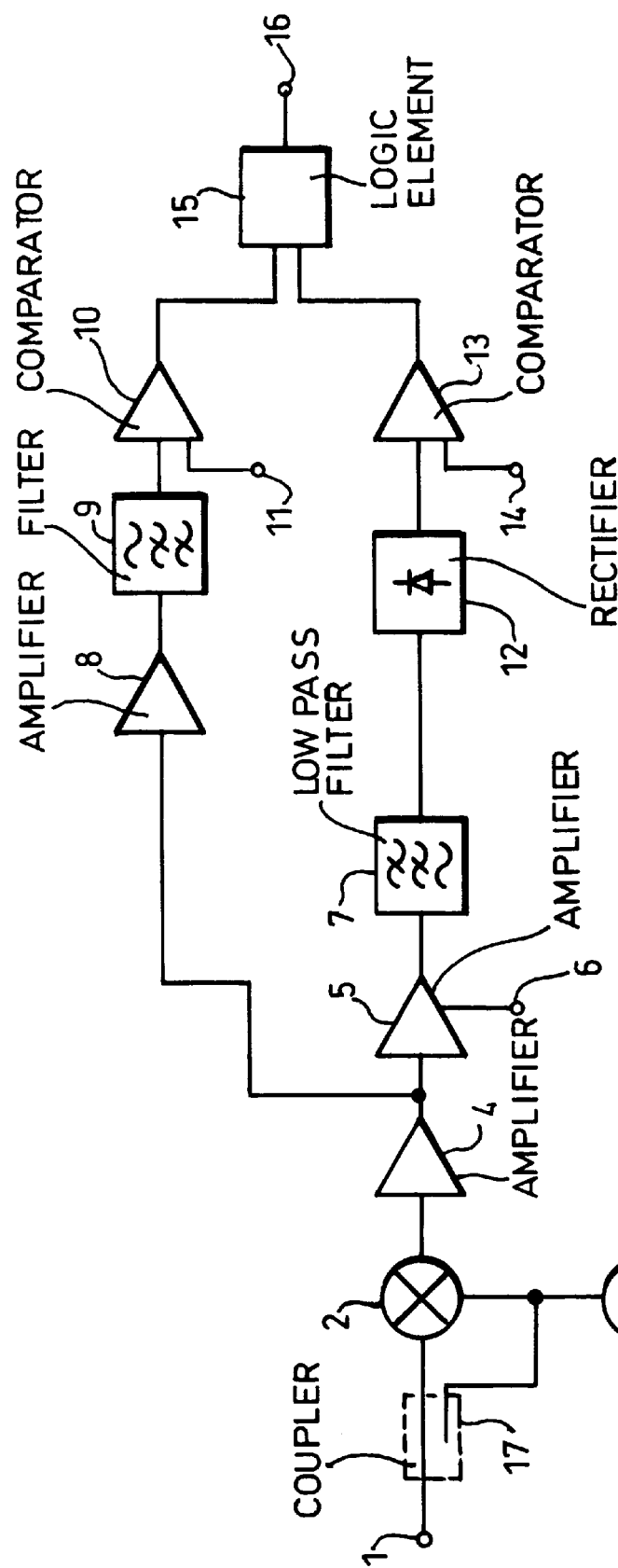
FIG. 2 shows a second alarm sensor in accordance with the first aspect of the present invention.

Referring to FIG. 2, the sensor arrangement 20B comprises the same elements as the FIG. 1 sensor 20A, from which Figure reference numerals have been retained.

The differences between the sensor arrangements 20A and 20B exist in the connection of the output of the amplifier 4 to the input of the amplifier 8, instead of the output of the filter 7 to that amplifier 8. In the sensor arrangement 20B, the filter 9 has a cut-off frequency of 50 Hz and the filter 7 has a cut-off frequency of 40 Hz. As with the sensor 20A, the sensor 20B is operable to determine when signals in the 0–40 Hz frequency band exceed a predetermined amplitude threshold by way of the comparator 13, and uses this detection to indicate alarmable conditions. Signals indicative of the presence of externally generated interference are detected by the comparator 10, which receives only signals having frequencies of 50 Hz or more. Thus, the logic element 15 is operable to mute the sensor output 16 in the presence of sufficiently strong signals in the 50+ Hz frequency band. The sensor 20B can be arranged to be sensitive to interference signals over a larger range of frequencies than the sensor 20A.

Figure 3:
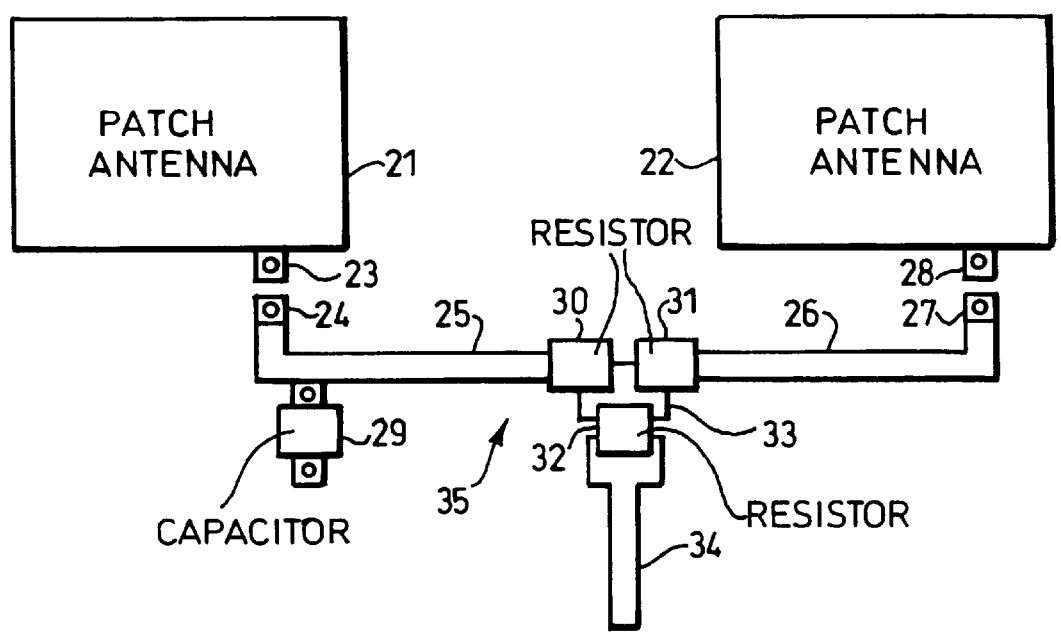
FIG. 3 shows an antenna arrangement in accordance with a second aspect of the present invention.

Referring now to FIG. 3, an antennae arrangement 35 is shown in accordance with a second aspect of the invention.

The antenna arrangement 35 comprises first and second patch antennae 21, 22 and a power divider, formed by components 30–33. The patch antennae 21, 22 are formed by the deposition of a thin layer of an electrically conductive material, preferably a metal, on one surface of a circuit board. A ground plane (not shown) is located on the other side of the circuit board to the antenna 21, 22. The antennae 21, 22 are connected to an input connector 34 by way of two metal vias (not shown), connecting pad 23 to pad 24 and pad 27 to pad 28 respectively, connecting arms 25, 26, resistive elements 30, 31, 32 and a conductor 33.

The resistive elements 30, 31, 32 allow equal division of the transmitter power from an input connector 34 between the antennae 21, 22. The resistance of each of the elements 30, 31 and 32 is preferably about 100 Ω.

A capacitor 29 is optionally connected between connecting arm 25 and ground potential to cause a phase difference in the signals at respective ones of the antennae 21, 22.

The patch antennae 21, 22 are rectangular in shape and are separated by a distance of 8 mm at their shortest sides. The antennae are preferably 20 mm by 30 mm and are separated from the ground plane by a distance of 1.5 mm, although the dimensions of the antennae depend on the shape of the desired field and the operating frequency. It is desirable to make arrangement 35 as symmetrical as possible and to isolate the power divider 30–33 and the connection arms 25, 26, from the antennae 21, 22 by placing them in a Faraday shield on an opposite side of the ground plane to antennae 21, 22. The inventors have found that this arrangement provides a rectangular field which, when placed on the ceiling of a vehicle, provides near perfect coverage of that vehicle. This is shown schematically in FIGS. 4A and 4B.

Figure 4A:
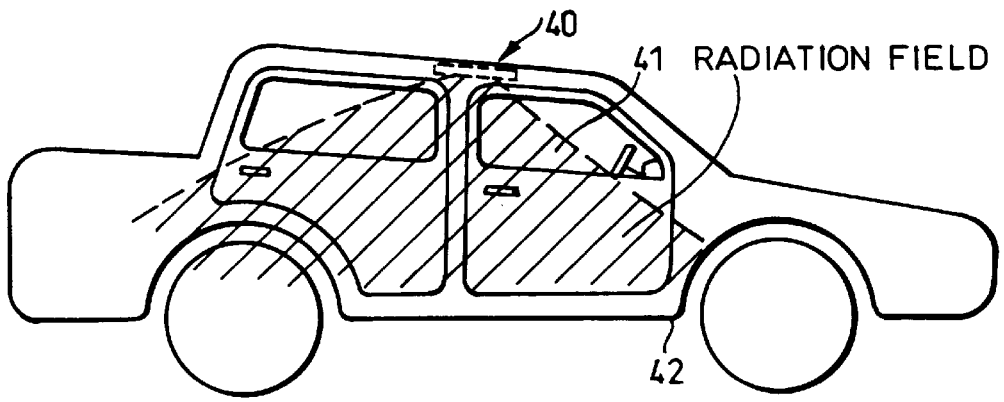
FIGS. 4A and 4B show side and plan views respectively of a vehicle having an alarm arrangement incorporating an antenna arrangement in accordance with the present invention.
Figure 4B:
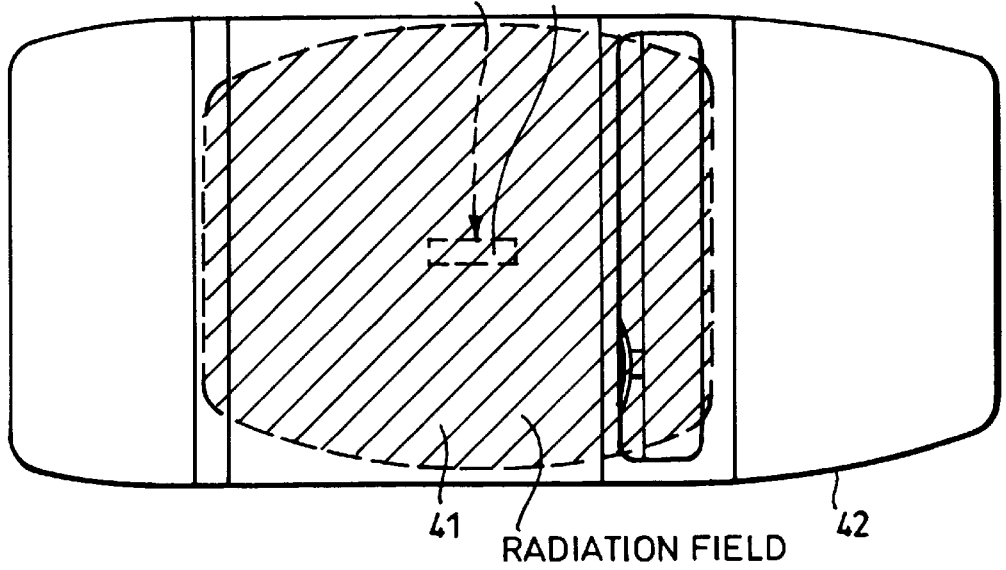

Referring to FIGS. 4A and 4B, an alarm arrangement 40 comprises both the antennae arrangement 35 of FIG. 3 and the alarm sensor 20A of FIG. 1 or the sensor 20B FIG. 2. The arrangement 40 is mounted either directly on the underside of the roof of a vehicle 42, or is suspended from roof lining thereattached. In the former case, a removable cover is preferably provided within the roof lining, to provide access to the arrangement 40 for servicing purposes. The radiation field within the vehicle 42 is shown by the hatched area 41.

The dimensions of the antennae arrangement 35 are such that the resulting field is about one and a half times as long as it is wide. In this way, the antennae 21, 22 ensure illumination of the entire interior of the vehicle whilst avoiding illumination of the exterior. The dimensions needed for an arrangement suitable for providing coverage of, for example, a multi-purpose vehicle or an MPV or a minibus could be easily calculated by a skilled person.

In some vehicles it is not possible to locate the arrangement 40 centrally in the vehicle 42. This will be the case if this space is occupied by, for example, a sunroof. It is often impracticable to compensate for this by placing the arrangement 40 offset from the centre and tilting it at an angle from the horizontal. Although this would inevitably provide reasonable illumination of the vehicle interior, it can take up a lot of space in the ceiling of the vehicle.

To overcome this problem, the radiation field generated by the antennae 21, 22 is able to be steered in accordance with a preferred feature of the present invention, allowing the arrangement 40 to be mounted off-centre in the roof of the vehicle 42 whilst still providing reasonable illumination of the vehicle's interior. This is achieved in the FIG. 3 arrangement by the connection of the capacitor 29. The capacitor 29 causes a change of phase in the signal reaching the antenna 21 from the input connector 34, so causing the antennae 21 and 22 to transmit out of phase signals. Thus steering of the radiation field is achieved, the degree of steering being determined by the value of the capacitor 29.

Alternatively, the capacitor 29 could be replaced by an inductor (not shown) which would similarly provide a phase change in the signals reaching the first antenna 21. Instead of the shown short connection of the capacitor 29, or of such an inductor (not shown), one or both of these elements could be series connected in either or both of the connecting arms 25, 26.

Radiation field steering could also be achieved by having the connection arms 25 and 26 formed of different lengths although this is unfavourable as it allows less flexibility in sensor design.

The antennae 21, 22 could be centre fed, instead of edge fed, to save space and minimize the size of the arrangement 40, although this would require the use of multilayer boards.

To provide increased flexibility of application, it is advantageous to use an antenna arrangement 35 having four patch antennae. In this way, a radiation field generated thereby can be steered in two planes, allowing reasonable illumination of a vehicle's interior to be provided from an arrangement 40 mounted, for example, in one corner of its roof. Such an arrangement could be used to advantage where mountability in the roof space is restricted by, for example, the folding nature of a soft-roofed convertible car. The use of four antennae also allows a radiation field to be narrowed. The narrowing occurs in the plane of polarization.

Figure 5:
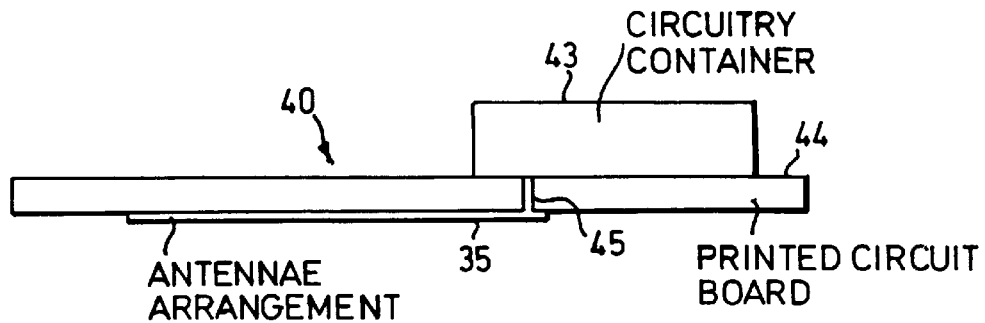
FIG. 5 shows the alarm arrangement of FIGS. 4A and 4B.

FIG. 5 shows one way in which the arrangement 40 may be organized. The arrangement 40 comprises a circuitry container 43, which contains circuit boards or integrated circuits implementing the FIG. 1 alarm sensor 20A or the FIG. 2 alarm sensor 20B, a printed circuit board 44 and the antenna arrangement 35 of FIG. 3. The antennae arrangement 35 is electrically connected to the circuitry container 43 through vias 45 in the printed circuit board 44. When the arrangement 40 is mounted adjacent to and beneath the roof of a vehicle 42 in the orientation shown in FIG. 5, the roof itself prevents the radiation field extending upwards therethrough, thereby eliminating the possibility of movement above the vehicle 42 causing false triggering.

The circuitry container 43 preferably comprises a metal can effective to shield the circuit boards or integrated circuits contained therein from radiation generated by the antennae arrangement 35 and from radiation generated externally. The metal can also prevents electromagnetic radiation, such as for example radiation resulting from oscillator harmonic signals, from the sensor 20 being radiated into the surrounding environment. The arrangement 40 thus provided can be of such dimensions as to be unobtrusive when mounted in the roof of a vehicle, yet provide reasonable illumination of that vehicle's interior.

We claim:

1. An alarm sensor of the type in which a microwave frequency signal is transmitted to illuminate a volume for subsequent reflection by surfaces within the illuminated volume and for reception by an antenna, for the purpose of detecting intrusion into the illuminated volume, the sensor comprising:

a first detector for detecting signals in a first frequency band, the first frequency band not including frequencies which would be indicative of intrusion into the illuminated volume, but including frequencies which would be indicative of the presence of a source of interference;

a second detector for detecting signals in a second frequency band, the second frequency band being different from the first frequency band and including frequencies which would be indicative of intrusion into the illuminated volume;

a first determiner for determining whether the level of the signals detected by the first detector exceeds a predetermined threshold;

a second determiner for determining whether the signals detected by the second detector include substantial levels of non-carrier microwave frequency signals; and a logic element to provide an alarm sensor output signal only when the second determiner provides a positive determination and when the first determiner does not provide a positive determination, the first determiner in effect muting the alarm sensor output.

2. The alarm sensor in accordance with claim 1, in which the first frequency band overlaps the second frequency band.

3. The alarm sensor in accordance with claim 1, in which the first frequency band does not overlap the second frequency band.

4. The alarm sensor in accordance with claim 1, in which the second detector includes a time delay device.

5. The alarm sensor in accordance with claim 4, in which the time delay device is a charge pump.

6. A vehicle comprising an alarm sensor of the type in which a microwave frequency signal is transmitted to illuminate a volume for subsequent reflection by surfaces within the illuminated volume and for reception by an antenna, for the purpose of detecting intrusion into the illuminated volume, the sensor comprising:

a first detector for detecting signals in a first frequency band, the first frequency band not including frequencies which would be indicative of intrusion into the illuminated volume, but including frequencies which would be indicative of the presence of a source of interference;

a second detector for detecting signals in a second frequency band, the second frequency band being different from the first frequency band and including frequencies which would be indicative of intrusion into the illuminated volume;

a first determiner for determining whether the level of the signals detected by the first detector exceeds a predetermined threshold;

a second determiner for determining whether the signals detected by the second detector include substantial levels of non-carrier microwave frequency signals; and a logic element to provide an alarm sensor output signal only when the second determiner provides a positive determination and when the first determiner does not provide a positive determination, the first determiner in effect muting the alarm sensor output.

* * * * *